United States Patent [19]

Lyons

[11] 3,860,267
[45] Jan. 14, 1975

[54] TRAILER HITCH BAR

[76] Inventor: Donald W. Lyons, Box 448, Fort Scott, Kans. 66701

[22] Filed: Sept. 14, 1973

[21] Appl. No.: 397,442

[52] U.S. Cl. .......................................... 280/478 B
[51] Int. Cl. ................................................ B60d 1/16
[58] Field of Search ........ 280/478 R, 478 A, 478 B, 280/494, 495

[56] References Cited
UNITED STATES PATENTS

| | | | |
|---|---|---|---|
| 2,446,223 | 8/1948 | Forney | 280/478 R |
| 2,973,971 | 3/1961 | Oddson | 280/478 B |
| 3,169,028 | 2/1965 | Scrivner | 280/478 R |
| 3,437,355 | 4/1969 | Jeffes | 280/478 R |

Primary Examiner—Leo Friaglia
Assistant Examiner—Randall Schrecengost
Attorney, Agent, or Firm—John A. Hamilton

[57] ABSTRACT

A trailer hitch bar carrying a hitch member at its rearward end and carried for fore-and-aft sliding movement in a sleeve fixable to the towing vehicle, the bar normally being retained fixedly in the sleeve by a latch, but being extendable rearwardly from said sleeve and horizontally pivotable when so extended for greater ease of registry with the hitch member of the towed vehicle, the bar being self-aligning with the sleeve so as to be re-engaged in the sleeve by backing movement of the towing vehicle after the hitch members are engaged.

2 Claims, 4 Drawing Figures

PATENTED JAN 14 1975  3,860,267

3,860,267

TRAILER HITCH BAR

This invention relates to new and useful improvements in trailer hitches, and has particular reference to a novel mounting for the element of an ordinary trailer hitch which is carried by the towing vehicle.

In the ordinary trailer hitch used for towing mobile homes, campers, boat trailers and trailers in general behind automotive vehicles, there are two cooperating and engageable hitch elements carried respectively by the towing vehicle and the towed trailer, each of these elements being fixedly associated with the vehicle to which it is attached. That is, the towing vehicle element must be fixedly related to the towing vehicle, and the trailer element must be fixedly related to some portion of the trailer. In the case of a two-wheeled trailer, the trailer hitch element is ordinarily mounted on a tongue fixed to the trailer body, and in the case of a four-wheeled trailer, the trailer hitch element is ordinarily mounted on a tongue connected into the steering linkage of the front trailer wheels. The practical difficulties of bringing the two vehicles into position with sufficient accuracy to effect registry and permit interengagement of the hitch elements are very well known. The towing vehicle hitch element can be moved horizontally only by carefully backing and "jockeying" the towing vehicle, and the driver usually cannot see the hitch elements, so that a directing assistant is required. The tongue of the trailer can sometimes be pivoted manually, or the trailer moved forwardly or rearwardly by manual power, in order to effect registry of the hitch elements, but this also can be extremely difficult or practically impossible in the case of heavy trailers.

Accordingly, the principal object of the present invention is the provision of means overcoming this difficulty by permitting ready registry and engagement of the trailer hitch elements with only approximately proper relative placement of the towing vehicle and the trailer. Generally, the improvement consists of a trailer hitch bar carried by the towing vehicle, and on which the towing vehicle hitch element is mounted, said hitch bar having a normal fixed position relative to the towing vehicle, but being extendable rearwardly therefrom, and when so extended being horizontally pivotable over a substantial range. In this manner, a much wider latitude of relative vehicle placement in which engagement of the hitch elements can be effected is provided.

Another object is the provision of a trailer hitch bar of the character described which can be returned to its normal position relative to the towing vehicle, and securely latched therein, simply by backing the towing vehicle under its own power, despite any considerable angular misalignment of the hitch bar and trailer tongue which may exist when the hitch elements are engaged. This feature of "self-alignment" greatly increases the convenience of use of the device.

Other objects are simplicity and economy of construction, and efficiency and dependability of operation.

With these objects in view, as well as other objects which will appear in the course of the specification, reference will be had to the accompanying drawing, wherein.

Figure 1:
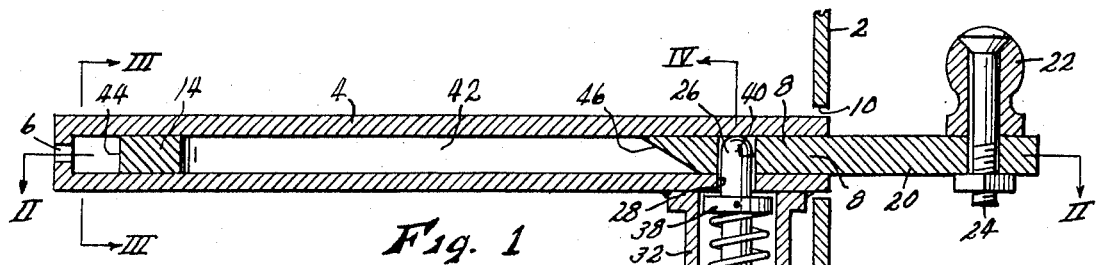
FIG. 1 is a longitudinal vertical sectional view of a trailer hitch bar device embodying the present invention, being an enlarged sectional view taken on line I—I of FIG. 2, with the hitch bar shown in its normal retracted position.
Figure 3:
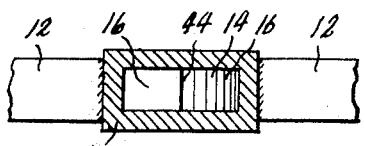
FIG. 3 is a sectional view taken on line III—III of FIG. 1.

Like reference numerals apply to similar parts throughout the several views, and the numeral 2 applies to the rear bumper of a towing vehicle. Disposed forwardly of said bumper, at the transverse midpoint thereof, is a rigid steel sleeve 4, said sleeve being horizontal and parallel to the direction of travel of the vehicle. Said sleeve may be closed at its forward end, but should have a vent hole 6 formed therein for a purpose to be described. As shown, said sleeve is of rectangular cross-sectional contour, and is angularly flared in a horizontal plane to form a rearwardly opening throat portion 8 which opens through an aperture 10 of bumper 2. Sleeve 4 is provided with brackets 12 by means of which it may be rigidly mounted on some rigid portion of the towing vehicle, not shown, for example the main chassis rails of the vehicle frame. Of course, the sleeve could be affixed to bumper 2 itself, but this is not practical due to wide variation of the contour of bumpers, and also because safety codes are more and more prohibiting the use of bumper-mounted trailer hitches, for the reason that bumpers are simply too flimsy and flexible to provide sufficiently a rigid mount.

Slidably mounted in sleeve 4 is a hitch bar 14, which is elongated and has the same external cross-sectional contour as the interior of sleeve 4. At its forward end, it is tapered horizontally to a point at its longitudinal midline, the converging side edges is thereof being convexly curved as shown in FIG. 2, and merging smoothy into the parallel side edges of the body portion thereof. Adjacent its rearward end, the hitch bar is provided with a triangular enlargement 18 which engages snugly in throat 8 of sleeve 4 when the hitch bar is inserted fully forwardly into the sleeve, as in FIG. 1. The hitch bar includes an extension 20 rearwardly from enlargement 18, and the towing vehicle hitch element 22, usually a spherical ball, is affixed to the top of extension 20 by bolt 24. The trailer hitch element, not shown, consists of a downwardly opening socket engageable over ball 22, and is fixed to the trailer tongue.

The sliding movement of hitch bar 14 in sleeve 4 is controlled by a latch pin 26, which is vertical and carried for upward vertical movement into throat portion 8 of sleeve 4 and being rounded at its upper end. It is carried slidably in a hole 28 provided therefor in the bottom wall of the sleeve, and a hole 30 provided therefor in a downwardly offset bracket 32 affixed to the sleeve therebeneath and provided at its lower end with an eye 34. A compression spring 36 based on bracket 32 and engaging a collar 58 fixed on the latch pin biases said latch pin upwardly to enter throat 8 of sleeve 4 to engage the top wall of said sleeve. Within throat 8, said latch pin may engage either a close fitting hole 40 formed vertically therefor in the triangularly enlarged portion of the hitch bar, said hole being aligned with said pin when the latch bar is fully inserted into the sleeve, as in FIG. 1, or in a longitudinally elongated slot 42 formed vertically through the hitch bar, said slot extending forwardly from a point just forward of hole 40 to a point just rearward of the forward tip 44 of the hitch bar. The hitch bar is formed to present a rearwardly and downwardly sloping cam surface 46 defining the rearward end of slot 42.

Figure 2:
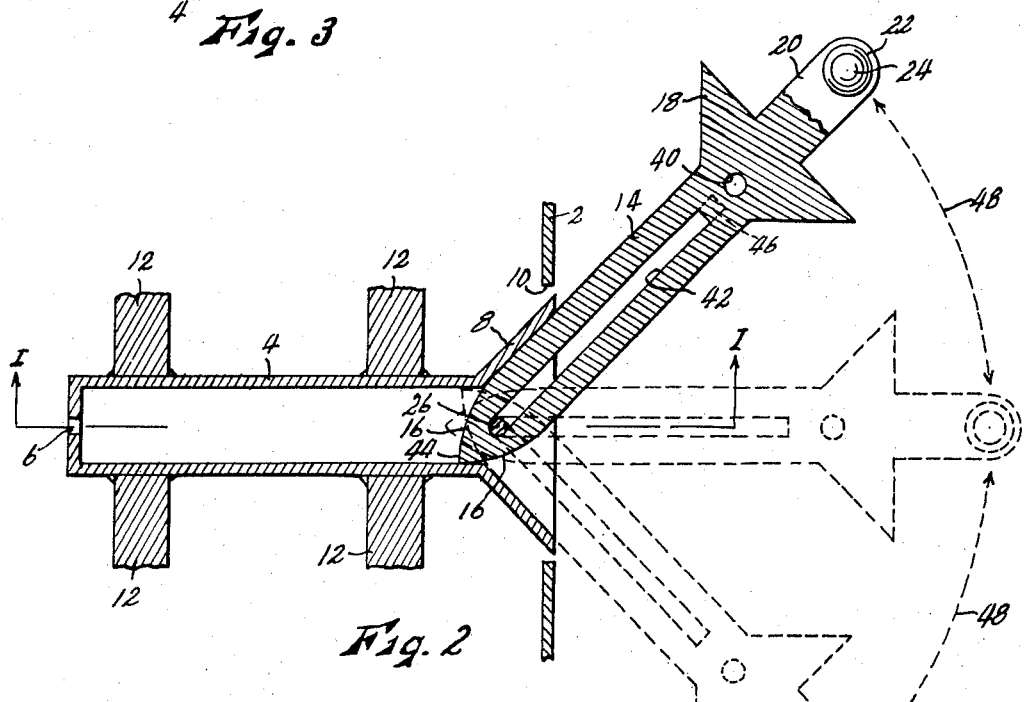
FIG. 2 is a slightly reduced sectional view taken on line II—II of FIG. 1, with the hitch bar extended and showing various pivotal positions of said hitch bar in dotted lines.
Figure 4:
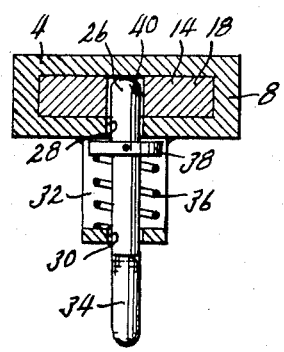
FIG. 4 is a sectional view taken on line IV—IV of FIG. 1.

In operation, it will be understood that FIG. 1 shows the normal towing position of the hitch bar, in which it is inserted fully forwardly into sleeve 4. In this position of the hitch bar, hitch ball 22 is rigidly positioned relative to the towing vehicle by the fixed relationship of the sleeve to the vehicle, and since the hitch bar is locked against rearward extension by the engagement of latch pin 26 in hole 40 thereof. However, when moving the towing vehicle into position to permit engagement of ball 22 by the trailer hitch socket, the operator reaches under bumper 2, grasps eye 34, and pulls the latch pin downwardly against spring 36 to disengage it from hole 40, and the hitch bar pulled rearwardly in the sleeve sufficiently that when the latch pin is released, it engages in slot 42. The hitch bar may then be moved forwardly or rearwardly to the full extent permitted by the length of slot 42, to facilitate proper placement of ball 22 relative to the trailer hitch socket. The movement of the hitch bar in sleeve 4 should be lubricated as by grease, and vent hole 6 prevents the formation of pressure or vacuum in the sleeve forwardly of the hitch bar, which would interfere with the free movement of the hitch bar. When the hitch bar is extended fully to the rear, as in FIG. 2, so that latch pin 26 is engaged in the forwardmost end of slot 42, it will be seen that the hitch bar can additionally be pivoted in a horizontal plane, as indicated by arrows 48 and by the dotted line views thereof, to the full extent permitted by the angular extent of sleeve throat 8. This greatly increases the latitude over which ball 22 may be placed to register it with the trailer hitch socket. The hitch bar may be pivoted laterally to some extent even before it is fully extended to the rear, due to the tapered configuration of the forward tip 44 thereof.

After the trailer hitch socket is operably connected to ball 22, the hitch bar can in most cases be reinserted into sleeve 4 simply by backing the towing vehicle under its own power, since this movement of the towing vehicle exerts a forward force on the hitch bar, and such force causes the convexly curved side edges 16 of the forward tip of the hitch bar to act as cams against the interior side wall surfaces of the straight portion of the sleeve, to force said hitch bar back into axial alignment with the sleeve for entry therein. This self-aligning action, which is of course enhanced if the sleeve and hitch bar are well lubricated, will normally occur even if the trailer tongue and hitch bar have been moved into an angular relation to effect engagement of the hitch elements, so long as the angle is not too great, even though this necessitates that the trailer be backed by the towing vehicle as the latter is backed, and at a slightly greater speed than tha latter. As the hitch bar aligns itself with the sleeve, the lateral movement of ball 22 simply pivots the tongue of the trailer correspondingly. If for any reason, such as uneven ground contour, extreme angularity of the trailer tongue to the hitch bar, poor lubrication, or any other reason, the hitch bar refuses to enter the sleeve when the towing vehicle is backed, then the towing vehicle may be moved forwardly a few feet, towing the trailer with it, which it can do since latch pin 26 is engaged in the forward end of slot 42, until the hitch bar and trailer tongue are generally linearly aligned, and then backing the towing vehicle. As the hitch bar approaches its position of full insertion into the sleeve, cam surface 46 thereof engages and depresses latch pin 26 against spring 36, and the latch pin snaps into hole 40 to lock the parts in their normal use position. For the described self-aligning action to occur, it will be seen that the forward tip 44 of the hitch bar must project forwardly into the straight portion of sleeve 4 even when said hitch bar is moved rearwardly to the full extent permitted by latch pin 26 and slot 42, and pivoted laterally to the full extent permitted by sleeve throat 8.

While I have shown and described a specific embodiment of my invention, it will be readily apparent that many minor changes of structure and operation could be made without departing from the spirit of the invention.

What I claim as new and desire to protect by Letters Patent is:

1. A trailer hitch bar device comprising:
   a. a sleeve member adapted to be affixed to a towing vehicle to extend generally parallel to the direction of vehicle travel and opening rearwardly,
   b. a hitch bar normally coaxial with and carried for unidirectional sliging movement in said sleeve for movement between forward and rearward positions, and extending rearwardly from said sleeve in said latter position,
   c. a towing vehicle hitch element affixed to the rearwardly extended end portion of said hitch bar,
   d. a pin insertable transversely through said sleeve adjacent the open rearward end thereof, said pin being engageable selectively either in a closely fitting hole provided therefor in said hitch bar adjacent its rearward end, whereby to latch said hitch bar in its forward position, or in a longitudinally elongated slot formed therefor in said hitch bar forwardly of said hole, whereby to serve as a stop limiting rearward movement of said hitch bar, said hitch bar being laterally pivotable relative to said sleeve on said pin when said hitch bar is in its rearward position,
   e. resilient means carried by said sleeve and biasing said pin in a direction to project through said sleeve, and
   f. mannually operable means for retracting said pin from said sleeve against said biasing means, said hitch bar being formed to present a cam surface at the rearward end of the slot thereof, said cam surface being operable as said hitch bar approaches said forward position to deflect said pin outwardly from said sleeve against said biasing means.

2. The structure as recited in claim 1 wherein said sleeve is straight except that its rearward portion has rearwardly divergent side walls to form an angular throat, said pin extending vertically through the throat portion of said sleeve for slidable engagement in the slot of said hitch bar, said pin, throat and slot being so relatively disposed that when said hitch bar is moved rearwardly to the full extent permitted by engagement of said pin in the forward end of said slot, said hitch bar may be pivoted laterally on said pin to the extent permitted by the angular opening of said throat, the forward tip portion of said hitch bar projecting into the straight portion of said sleeve at all angular portions of said hitch bar when in said rearward position, the side edges of said hitch bar tip portion converging arcuately toward said tip, whereby said curved edge portions serve as cams against the straight portion of said sleeve tending to move said hitch bar into coaxial relation with said sleeve whenever a forward force is exerted on said hitch bar.

\* \* \* \* \*